Jan. 6, 1925.　　　　　　　　　　　　　　　　1,521,959
A. M. LOCKETT ET AL
CREOSOTING PLANT
Filed Feb. 27, 1924　　　3 Sheets-Sheet 3
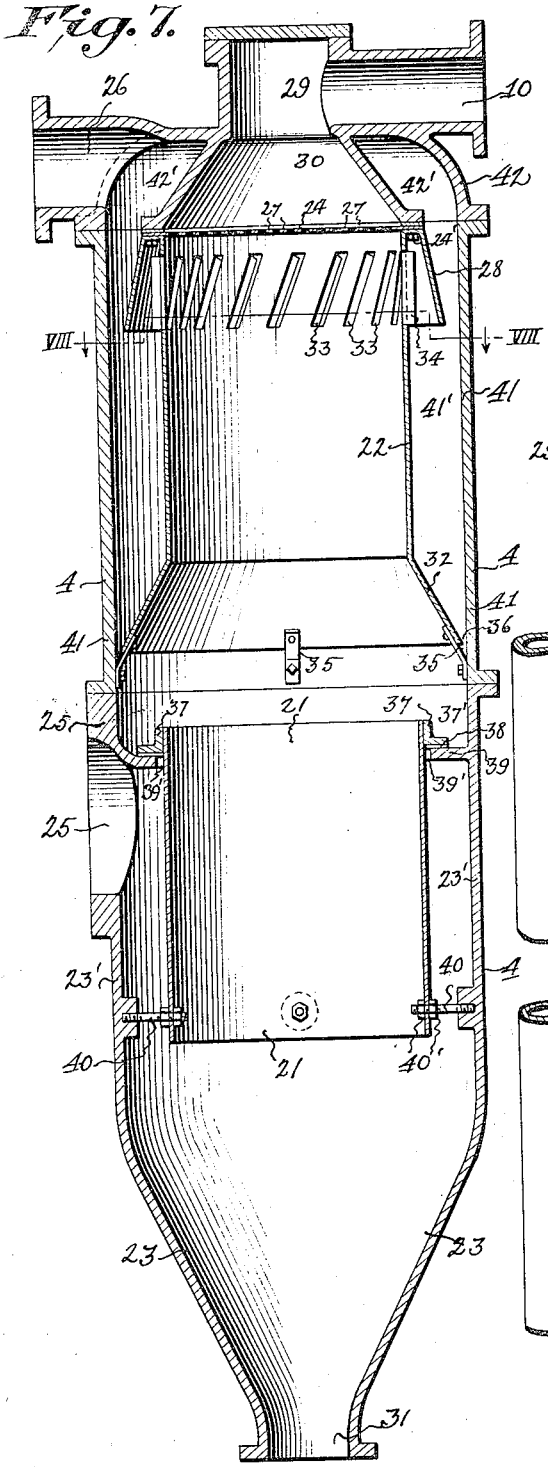
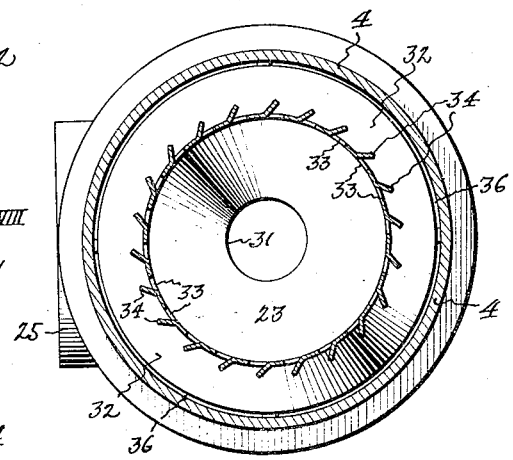
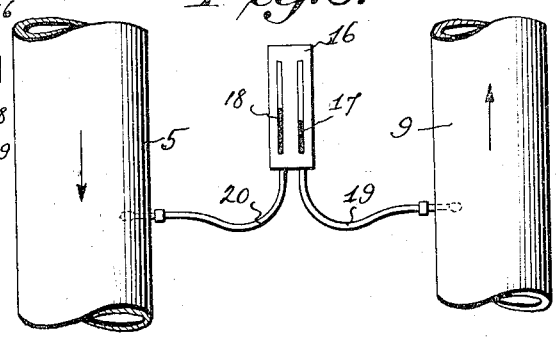
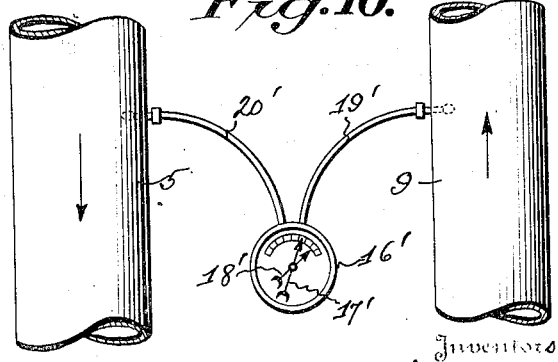
Inventors,
Andrew M. Lockett,
Bernard S. Nelson,
W. Schomborn.
Attorney Patented Jan. 6, 1925.

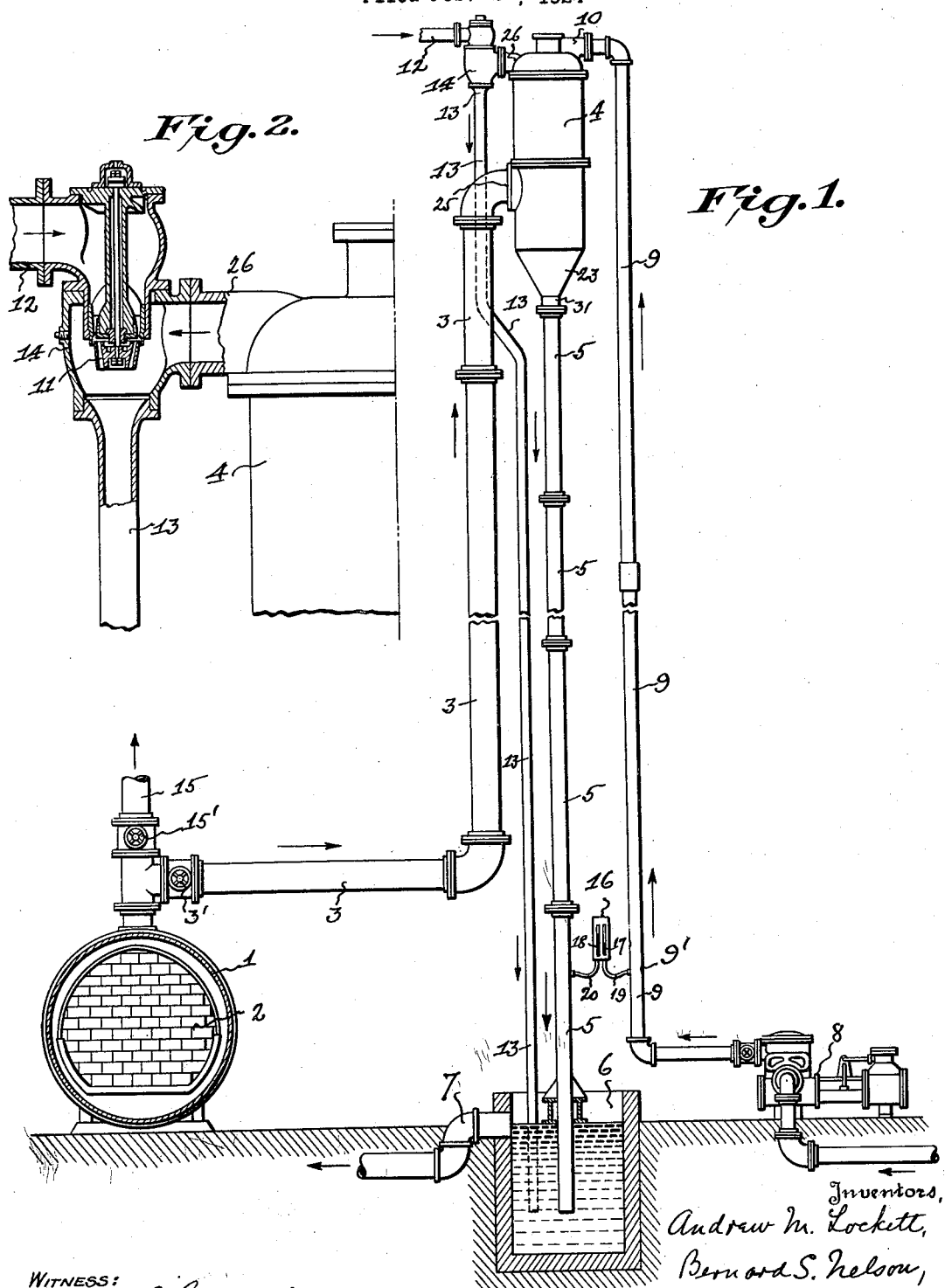

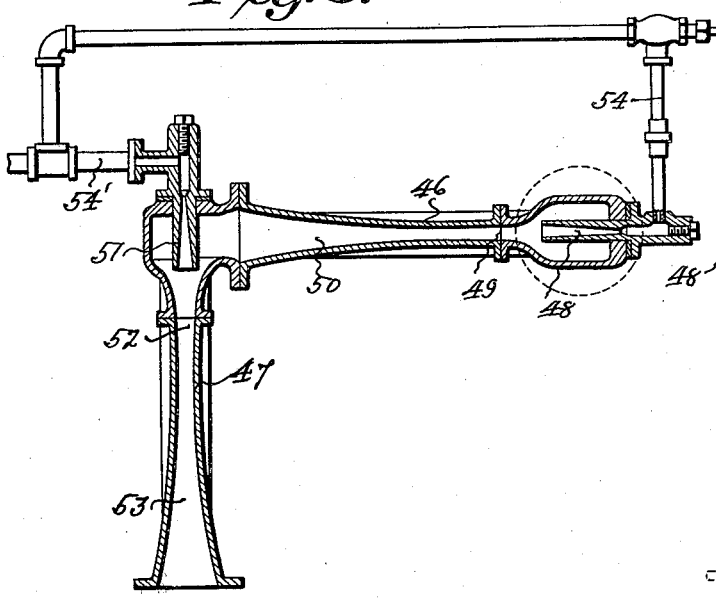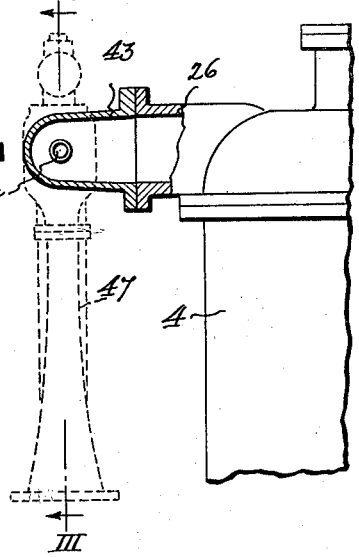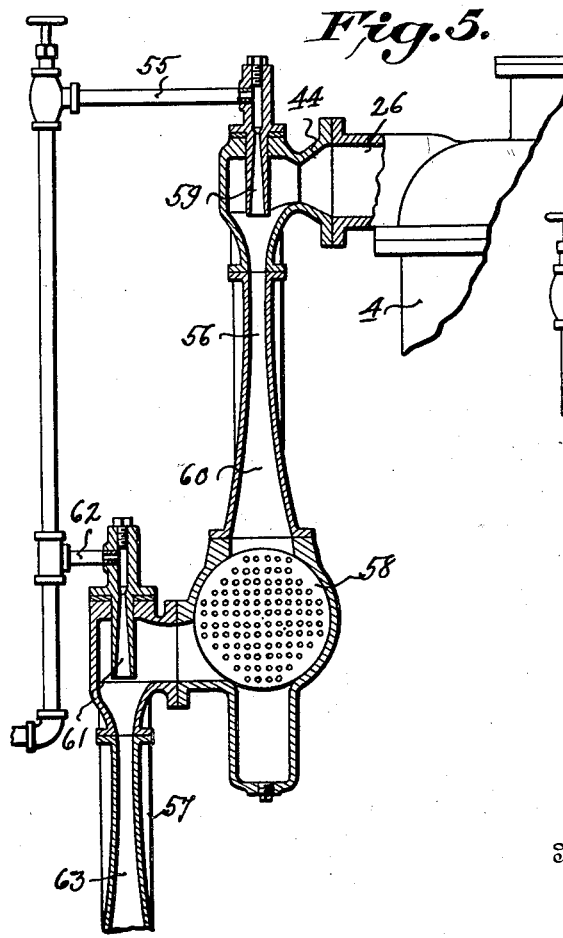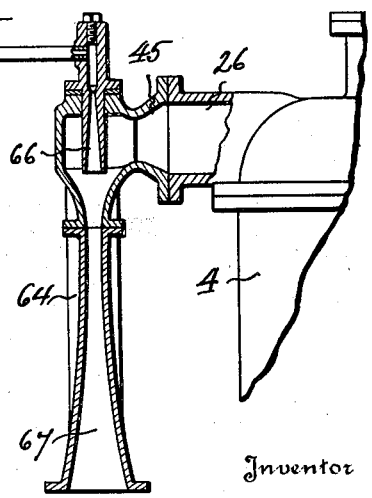

1,521,959

UNITED STATES PATENT OFFICE.

ANDREW M. LOCKETT AND BERNARD S. NELSON, OF NEW ORLEANS, LOUISIANA, ASSIGNORS TO A. M. LOCKETT & CO. LTD., OF NEW ORLEANS, LOUISIANA, A CORPORATION OF LOUISIANA.

CREOSOTING PLANT.

Application filed February 27, 1924. Serial No. 695,515.

*To all whom it may concern:*

Be it known that we, ANDREW M. LOCKETT and BERNARD S. NELSON, citizens of the United States, residing at New Orleans, in the parish of Orleans and State of Louisiana, have invented certain new and useful Improvements in Creosoting Plants, of which the following is a specification.

In the art of creosoting or other porous material impregnating processes, the material such as timber or other wooden material is deposited into a chamber or retort which is then sealed to make it air-tight. Live steam is then admitted into said retort charged as above indicated until the steam pressure within the retort is capable of permeating all the interstices within and thoroughly heating all the material to be treated in the sealed retort depending on the material treated from 250° to 275° F., and after so treated the steam is allowed to quickly escape, and the nearest approach to a vacuum in the retort is produced in as short a time as possible. By the action of the steam escaping from and being blown out of the retort by its own pressure, the temperature of the wood or other material with its moisture and non-condensable gases contained in its cellular structure or interstices has a temperature approximately between 250° and 275° F., the boiling point of water at atmospheric pressure being 212° F., its boiling point at 30 inches of vacuum is only and about 30° F., and hence the nearer an absolute vacuum is created in the retort the lower the boiling point of the moisture contained within the retort.

The moisture and created non-condensable gases being extracted from the porous material within the retort, said retort is filled with oil, such as coal tar creosote or other desirable impregnating material under such pressure until the material within the retort has been thoroughly impregnated with said oil, when the excess of oil not absorbed may be withdrawn, as is usual in this class of processes.

The invention relates to creosoting or impregnating or thoroughly saturating porous material with a suitable fluid and particularly to the condensing system employed.

One object of the invention is to provide a condensing system in an impregnating plant, which will produce a higher vacuum than has thus far been attained in similar systems.

Another object is to provide a condensing system which will attain such higher vacuum in a shorter interval of time than has heretofore been possible with existing apparatus.

A further object is to keep the size and number of elements of the system as small and as few as possible to reduce initial cost of equipment without impairment of efficiency.

Still another object of the invention is to simplify the operation of the equipment by the reduction of the number and size of elements necessary.

Another object of invention is to provide a unitary condensing and separating element of reduced size, capable of handling a widely varying amount of steam and an unusually large amount of air and gases and incapable of being injured by water.

Other objects and advantages of the invention will be fully and clearly understood and become apparent from the detailed description to be hereinafter more fully given.

The invention consists in the structural characteristics, relative arrangement and combinations of elements hereinafter more fully disclosed and particularly pointed out in the appended claims.

In the accompanying drawings, in which similar reference characters indicate the same parts in the several figures—

Figure 1 is a view in front elevation of an impregnated system embodying our improvements.

Figure 2 is a view partly in section showing the attachment of a hydraulic vacuum pump to the condenser for producing the vacuum within the condenser.

Figure 3 is a vertical section on line III—III of Figure 4 of the two stage air or steam ejector indicated in Figure 4.

Figure 4 is an elevation partly in section of the ejector and condenser coupling, the ejector being shown in dotted lines and the condenser partly broken away.

Figure 5 is a vertical section of a two stage steam or air ejector with surface intercooler, showing the connection with the air outlet of the condenser.

Figure 6 is a vertical section of a single stage ejector as connected with the air outlet of the condenser.

Figure 7 is a vertical section of the combined barometric condenser, separator and cooler.

Figure 8 is a horizontal section through the separator on the line VIII—VIII of Figure 7 looking in the direction of the arrows.

Figure 9 is a front elevation of the differential indicating device for indicating or reading the stage of completion of the evacuating operation.

Figure 10 is a front elevation of an alternative form of the differential indicator shown in Figure 9.

Referring to the drawings, Figure 1 shows for example an impregnating or creosoting retort 1 containing the porous or fibrous material 2, such as wood, which is to be impregnated with a desired fluid or preserving material, such as coal tar creosote.

From retort 1, an exhaust pipe 15 controlled by valve 15' leads to the atmosphere. A second pipe 3 controlled by valve 3' leads to a barometric condenser and separator 4, said condenser and separator having a tail pipe 5 of at least thirty-three feet in length leading from the lower conical extremity of the condenser 4 to a hot well 6 which receives the condensate from the condenser and acts as a seal therefor against admission of air to the condenser. An overflow pipe 7 leads from the hot well 6 as shown.

A cold water pump 8 of any usual type pumps water into the upper end of the condenser and separator through a pipe 9 which preferably at one point 9' lies in proximity to the tail pipe 5 for the attachment of a differential temperature indicating device 16 which will presently be described.

An ejecting device 14 is connected with the upper end of the condenser to withdraw and eject the air and non-condensable gases coming over to the condenser 4 from the material in the retort 1 and from leakage. Said ejecting device 14 is connected with the hot well 6 by means of a pipe 13 sealed against the air at its extremity by the water in said hot well, as shown and clearly understood.

The particular ejecting device 14, shown in Figure 1, is a well known form of hydraulic vacuum pump taking water through inlet 12 and by means of a revolving jet wheel 11, shown in Figure 2, hurling prisms of water down the contracted throat of pipe 13, thus drawing and entraining the air and gases from the condenser 4, pipe 3 and retort 1, and carrying said air and gases to the atmosphere through the hot well 6.

Other forms of ejector suitable to our condenser are shown in Figures 3, 5 and 6, illustrating well known types of, respectively, a multistage ejector, a multistage ejector with suface intercooler, and a single stage ejector, all employing preferably steam as the motive force, although water or compressed air may be substituted or employed if so desired, and said form of ejector is used for the reason that the same cannot be injured by water and is cheaper in first cost as well as reducing the amount of pipe work in its installation.

The two-stage ejector shown in Figures 3 and 4 is connected to the outlet 26 of condenser 4 by means of a coupling 43. Pressure or motive fluid, such as steam, is admitted through pipe 54 to nozzle 48 of the first stage ejector 46. This pressure fluid is directed through the throat 49 into a diffuser 50 of a Venturi tube, entraining and drawing air and gases from condenser 4 through outlet 26. The pressure produced in diffuser 50 forces the air into the nozzle chamber of the second stage ejector 47 arranged at right angles to 46, where a second jet of steam from nozzle 51 supplied by branch pipe 51' throws the air or gases from the diffuser 50 through throat 52 into the diffuser 53 and thence into any suitable discharge, not shown, to the atmosphere.

In Figure 5, the two ejectors 56, 57 have interposed between them a surface condenser or cooler 58, the first stage ejector 56 being coupled with the barometric condenser 4 at 44, the pressure fluid from pipe 55 passing through nozzle 59 and diffuser 60 and throwing the gases and vapors through a surface condenser 58 from which they are drawn by the second stage ejector 57 which receives its pressure fluid from pipe 62, ejecting by means of nozzle 61 the air and gases through diffuser 63 to the final discharge, not shown.

In Figure 6 the single stage ejector 64 is shown connected to the outlet 26 of the barometric condenser 4 by means of a coupling inlet 45, the nozzle 66 receiving its pressure fluid from pipe 65 and ejecting through diffuser 67 to the final discharge and atmosphere as will be readily understood.

Our combined barometric condenser, separator and cooler 4, Figure 7, comprises a unitary cylindrical structure built up preferably of three sections, namely, a condenser cone 23, a separator and cooler section 41 and a water inlet and air outlet section 42, all rigidly connected together to form an air-tight unit.

The condenser cone section 23 has its lower portion formed as an inverted cone converging to an outlet 31 leading into the tail pipe 5, see Figure 1.

Air and gas inlet 25 is provided in the upper side wall 23′ of cone section 23 for connection with the exhaust or outlet pipe 3, of the retort 1. A condensing tube 21 is rigidly mounted in spaced relation to the inner side of wall 23′ opposite the inlet 25. An L-flange 37 having grooves 38 in the under surface of the lower limb 37′ is fastened to the outer surface of the upper end of tube 21 and rests upon a circular flange 39 projecting from the interior of wall 23′ of the section 23. Near its lower end the tube 21 is rigidly connected to wall 23′ by means of screw-bolts 40 and clamping nuts 40′ in well known manner. The tube 21 is fitted loosely through flange 39 leaving a space 39′ between its outer wall and the end of flange 39 and communicating with the grooves 38 so as to afford a passage to the tail pipe of the water condensed or separated in the section 41.

The intermediate section 41 of the condenser contains the drum 22 having its lower end formed as a divergent flange as at 32 being rigidly attached to the inner wall of section 41 by means of straps 35, the end of the diverging portion 32 being spaced slightly as at 36 from the wall of section 41 to allow the drainage of liquid that may be condensed in this section down through grooves 38 and 39′ to the tail pipe 5, through the outlet 31.

The upper part of drum 22 is formed with obliquely extending slots 33 and corresponding louvre plates 34 struck out of drum 22 at a suitable angle to the surface of the drum and acting as a separator for the stream of liquid carrying air moving up through drum 22 by throwing said stream against a hood 28 surrounding said louvre plates and against the inner surface or wall of section 41. The centrifugal force of the stream will cause the particles of water to collect on the hood and section wall 41 and drain down through passages 36, 38, 39′ and outlet 31 to the tail pipe 5, and the dry air and gases escaping from under the hood and being drawn upwardly through outlet 26 by the ejector 14, see Figure 1.

It will be seen that the hood 28 and drum 22 thus insure only air or gases from which the moisture has been thoroughly separated to be drawn up into outlet 26. This arrangement forms a unitary, and at the same time, a compact and efficient structure occupying but a small space as compared with similar apparatus heretofore employed for the same purpose.

The top section 42 of condenser 4 forms, as shown, a closed cap piece for the condensor and is formed or provided with a cold water inlet 10 leading to a water chamber 29, 30, the lower portion 30 of this chamber being in the form of a truncated cone, whose base registers with the top of drum 22 and is tightly clamped thereto by means of bolts 24′ or other suitable means. A spray plate 24 provided with suitable perforations 27 is clamped between the cone 30 and drum 22.

The cap section 42 is also provided with a suitable air or gas inlet 26, as shown, the cone 30 being surrounded by an air chamber 42′ leading from air chamber 41′ in section 41 to the air outlet 26.

Figure 9 shows our differential indicator 16 consisting of two duplicate thermometers 19, 20 having their respective bulbs, one in the cold circulating water of pipe 9, and the other in the condensate liquid in tail pipe 5. The liquid columns 17, 18 of these thermometers are brought in proximity to each other in parallel relation on a common mounting surface 16, the upper ends of the thermometer tubes being alined with each other or if scales be provided on the tubes then the zero points being alined with each other. The liquid level of one thermometer will be alined with that of the other when both thermometers indicate the same temperature, or in other words, an equality of temperature in pipes 9 and 5 will be indicated at a glance when the liquid meniscus in one thermometer is alined with or abreast of that in the other.

Figure 10 shows an alternative form of indicator 16′ in which the liquid columns 17 and 18 have been substituted by two rotary indicating hands 17′ and 18′ concentrically pivoted and each operated independently of the other by its particular thermometer element 19′ or 20′ connected to pipes 9 and 5 respectively. When the hands 17′ and 18′ become superposed, the thermometers 19′ and 20′ will be indicating the same temperature, that is, the temperature of the water in pipe 9 entering the condenser will have the same temperature as the condensate in pipe 5 leaving the condenser showing thus at a glance that no more steam or vapor is being condensed by the cold water of pipe 9 flowing through the condenser 4, and when these conditions are reached there is no necessity for continuing the operation for the reason that no additional benefit is secured by maintaining the vacuum.

If desired, a temperature indicating scale may be provided on the thermometers in Figures 9 and 10, but such scale is not essential for the proper functioning of the indicators.

The various parts being constructed and arranged as shown in Figure 1, with the pressure or vacuum retort 1 filled with wood 2 or other similar material to be impregnated with coal tar creosote or other similar fluid, the retort door is tightly sealed and valves 3′ and 15′ are closed.

Live steam is then admitted under about thirty pounds pressure into said retort 1 in the usual manner, which pressure is maintained a specified time to insure a thorough heating of the interior of the wood or other material. The live steam is then shut off and valve 15' opened to relieve the steam in the retort to the atmosphere through vent 15. Without delay valve 15' is then closed and valve 3' opened to connect the retort with condenser 4 into which the pump 8 is throwing cold condensing water, the ejector at 14 having been put into operation to create a vacuum in condenser 4 and through pipe 3 in the retort 1. The vacuum thus created in retort 1 by opening of valve 3' causes the heated moisture and other liquids contained in the interstices in the wood or other porous material to quickly evaporate filling the retort with steam and vapors from the wood or other material within it. The vacuum created sucks these vapors into the condenser along with a certain quantity of air which constantly leaks into the retort and other elements of the system.

In order to completely remove this moisture and other liquids from the wood or other material to be treated, it is essential that a quick and high vacuum be created and maintained so as to prevent cooling of the wood and also bring the boiling point of the wood contained liquids down to as low a point as possible.

Besides the condensable vapors from the retort a large quantity of air from leakage into the system and non-condensable gases are thrown into the condenser.

This is especially the situation when the vacuum is first created in the condenser and retort, at which moment a very large amount of steam is drawn to the condenser as also a very large amount of air and gases. As the moisture in the wood evaporates and the timber or other material gradually cools off, the quantity of steam and vapor becomes less and less and after a comparatively short time no more steam or vapors are condensed in the condenser, but the quantity of air entering is approximately constant so that a fairly large quantity of air must be handled throughout the cycle.

To meet these conditions, the ordinary form of steam condenser was found to be impractical as being incapable of handling the large volume of air and gases as compared with the volume of steam. Furthermore, a standard steam condenser capable of handling the great volume of steam coming over at the beginning of the cycle as compared with the quantity to be handled after a short interval of time, would be prohibitive in size and hence in cost.

In our condenser we have succeeded in overcoming these difficulties and objections by constructing a comparatively small condenser capable of handling a widely varying amount of steam and an unusually large amount of air and gases.

The steam, air and gases enter the condenser 4 through inlet 25 striking tube 21, travel downwards and around the bottom of and then up through tube 21 meeting at this point with a rain of cold condensing water from spray plate 24. The steam is here condensed and flows down the cone 23 into the tail pipe 5 which opens into the water seal in hot well 6. The heated air and non-condensable gases continue to rise and enter the cooling drum 22 where the air and gases are further cooled by the rain of water from spray plate 24. On reaching the louvre openings or slots 33 of the separator in the upper part of this drum 22, the cooled air and gases which have taken up some particles of moisture in their prolonged passage through the water spray are thrown out tangentially and with a centrifugal motion striking the hood 28 and inner wall of section 41, the particles of moisture carried by the stream of air and gases being caught on the hood 28 and wall mentioned and draining down into the tail pipe 5, as heretofore described.

The dry air and non-condensable gases are then sucked up from under the hood 28 and continuously drawn through outlet 26 by the action of the ejector 14, as will be readily understood and needs no further explanation. Said ejector may be of any one of the forms shown in detail in Figures 2, 3, 4, 5 and 6 and herein described, and is of such a form and construction that the ejector cannot be injured by water should the same be drawn over accidentally and also is cheaper in its first cost and as well as minimizing the expense of pipe used for its installation.

From the foregoing disclosure of the construction of the device and the arrangement of the different elements comprising the creosoting system and the condenser, it will be apparent that all the objects, functions and advantages of the system and condenser set forth in the statement of invention have been fully and efficiently carried out. It is also evident that while I have particularly described the apparatus used in connection with the full cell process as applied to unseasoned timber in which the steaming is done merely to dry or season the wood, and the condenser is used principally for condensing the evaporated moisture from the wood and the air and other uncondensable gases taken care of by the ejector, the present invention may be efficiently and also used in carrying out the "Rueping process" which is extensively and particularly used in treating cross-ties, and said process has for its object to simply impregnate the cellular tissue of the wood with creosote and to withdraw the superfluous creosote oil in the pores of the wood, thereby resulting in a decided saving in the cost of creosote oil used for a given quantity of cross-ties.

In carrying out the "Rueping process," the timber in the enclosed retort or cylinder is subjected to an air pressure of about one hundred pounds pressure per square inch and made to fill all the cells of the wood with air. The retort or cylinder is then filled with the creosote oil without permitting the air in the wood to escape, and the oil is then forced through the air into the wood. The retort or cylinder is then drained and the operation of the condenser started. The vacuum produced by said condenser causes the air in the wood to expand and force out the superfluous and a large portion of the creosote oil in the wood, and the condenser which through its novel construction and arrangement acts as an air pump of large capacity as heretofore described, thereby producing a quicker and higher vacuum as herein explained, to more effectually withdraw the creosote oil from the wood.

It will also be manifest that in the use of the apparatus where steam is used to dry the wood and the drying is accomplished principally by the heat put into the wood, if the boiling point or temperature is immediately reduced by the high and quick vacuum of the present improved condenser and hence the quicker the vacuum is applied, the less heat is lost through radiation and the more heat is available for evaporation, and the higher the vacuum applied the lower the boiling point and greater the heat range for evaporating purposes is accomplished by our improved condenser over that of the prior and ordinary forms of condensers which have little or no air pump capacity.

It will also be seen that recording thermometers could be substituted for the type of thermometers shown and described for determining and indicating the temperatures of the cold circulating water and the condensate liquid, in order to secure a graphic and permanent record of the operations of the apparatus during the progress and cycle of each treatment or charge of the cylinder or retort.

It is also evident that many slight changes in the relative arrangement of parts shown and described might be resorted to without departing from the spirit and scope of our invention. Hence we would have it understood that we do not wish to confine ourselves to the exact construction shown and described except as defined by the appended claims.

Having fully described our invention, what we claim as new and desire to secure by Letters Patent, is:—

1. In an impregnating system for wood or similar porous material, means for creating a high and quick vacuum in the impregnating retort, comprising a unitary barometric condenser and separator connected with said retort, means for creating a vacuum in the condenser and separator, means for spraying condensing liquid through the condenser and separator while under vacuum, and means for conducting off the condensate while under vacuum.

2. In an impregnating system for wood or similar porous material, means for creating a high and quick vacuum in the impregnating retort comprising a unitary barometric condenser and separator connected with said retort, said condenser and separator unit comprising superposed condenser and separator sections vertically arranged to afford an interupted and undiverted passage from one of said sections through the other.

3. In an impregnating system for wood or similar porous material, means for creating a high and quick vacuum in the impregnating retort, said means comprising a unitary condenser and separator vertically arranged, a vacuum pump connected with said condenser and separator at its other end, an inlet from the retort in the lower part, a tail pipe leading from the lower extremity of the condenser for conducting away the condensate, and a chamber in the upper end of the condenser opening into the condenser with means for supplying circulating condensing fluid to said chamber.

4. In an impregnating system for wood or similar porous material, means for creating a high and quick vacuum in the impregnating retort comprising a unitary condenser and separator constructed of a plurality of superposed sections, combined into a unitary whole, a condensing drum in the lower section in spaced relation to the section walls, the section wall having an opening for the admission of fluid to be condensed and separated.

5. In an impregnating system for wood or similar porous material having an impregnating retort, means for creating a high and quick vacuum in the impregnating retort comprising a unitary barometric condenser and separator communicating with said retort, means for creating a vacuum in the condenser and separator, means for spraying condensing liquid through the condenser and separator, means for conducting off the condensate, and means for simultaneously and quickly comparting the temperature of said condensing liquid and condensate to determine the progress and completion of the evacuation in said retort.

6. In an impregnating system for wood or similar porous material having an impregnating retort, means for creating a high and quick vacuum in the impregnating retort, comprising a unitary barometric condenser and separator connected to said retort, a fluid ejector for withdrawing air and non-condensable gases collected within said barometric condenser and separator, means for spraying condensing liquid through the condenser, and means for conducting the condensate and condensing liquid from within said barometric condenser and separator.

7. In an impregnating system for wood or similar porous material having an impregnating retort, means for creating a high and quick vacuum in the impregnating retort, comprising a unitary barometric condenser and separator connected to said retort, a plurality of fluid ejectors arranged in series for withdrawing air and non-condensable gases collected within said barometric condenser and separator, means for spraying condensing liquid through the condenser, and means for conducting the condensate and condensing liquid from within said barometric condenser and separator.

8. A unitary condenser and separator for creating a high vacuum in an impregnating system for wood or similar porous material comprising a plurality of superposed sections combined into a unitary whole, a drum in the lower section in spaced relation to the section walls, the lower section having an opening for the admission of fluid and vapors to be condensed and separated and an outlet for the condensate, an upper separator and cooler section provided with condensing fluid inlet and an air and non-condensable gas outlet, a condensing drum within and spaced from the inner wall of said upper section, the upper open end of said condensing drum being in communication with said condensing fluid inlet and provided with a foraminous condensing fluid spray plate and its upper wall section having openings for the escape of the air and non-condensable gases collected within said condensing drum to the air and non-condensable gas outlet.

9. A unitary condenser and separator for creating a high vacuum in an impregnating system for wood or similar porous material comprising a plurality of superposed sections combined into a unitary whole, a drum in the lower section in spaced relation to the section walls, the lower section having an opening for the admission of fluid and vapors to be condensed and separated and an outlet for the condensate, an upper separator and cooler section provided with condensing fluid inlet and an air and non-condensable gas outlet, a condensing drum within and spaced from the inner wall of said upper section, the upper open end of said condensing drum being provided with a foraminous condensing fluid spray plate and its upper wall section having openings for the escape of the air and non-condensable gases collected within said condensing drum to the air and non-condensable gas outlet, and a hood supported from the upper end of the condensing drum and interposed between the openings in said condensing drum and inner wall of said upper section.

10. A unitary condenser and separator for creating a high vacuum in an impregnating system for wood or similar porous material comprising a plurality of superposed sections combined into a unitary whole, a drum in the lower section in spaced relation to the section walls, the lower section having an opening for the admission of fluid and vapors to be condensed and separated and an outlet for the condensate, an upper separator and cooler section provided with a condensing fluid inlet and an air and non-condensable gas outlet, a condensing drum within and spaced from the inner wall of said upper section, the upper open end of said condensing drum being provided with a foraminous condensing fluid spray plate and its upper wall section having openings for the escape of the air and non-condensable gases collected within said condensing drum to the air and non-condensable gas outlet.

In testimony whereof, we affix our signatures.

ANDREW M. LOCKETT.
BERNARD S. NELSON.